FIG. 3A.

INVENTOR.
PAUL I. EVANS
MAURICE R. RANSOM
BY
S. J. Rotondi, A. J. Dupont & S. Dubroff
ATTORNEYS:

FIG. 3C.

INVENTOR.
PAUL I. EVANS
MAURICE R. RANSOM

Aug. 14, 1962    P. I. EVANS ETAL    3,049,056
WEAPON CONTROL SYSTEM
Filed June 9, 1960    10 Sheets-Sheet 10

INVENTOR.
PAUL I. EVANS
MAURICE R. RANSOM
BY
ATTORNEYS:

United States Patent Office 3,049,056
Patented Aug. 14, 1962

3,049,056
WEAPON CONTROL SYSTEM
Paul I. Evans, Livermore, and Maurice R. Ransom, Torrance, Calif., assignors to the United States of America as represented by the Secretary of the Army
Filed June 9, 1960, Ser. No. 35,099
5 Claims. (Cl. 89—1)

This invention relates to weapon control systems, and more especially to an improved weapon control system which is operable from a remote location to select different firing orders for a plurality of weapons and automatically to fire such weapons in accordance with the selected order. Important additional features of this system are (1) means for restricting the firing current to a predetermined very small time interval, (2) a breech actuator controlled from a remote point and interlocked with the weapon firing circuit to permit firing of a weapon only when its breech is closed, and (3) means for indication at a remote point whether or not a weapon contains a projectile.

The invention will be better understood from the following description when considered in connection with the accompanying drawings and its scope is indicated by the appended claims.

Referring to the drawings:

FIG. 1 is a partial view indicating the relation between the major and minor weapons and certain of their adjuncts.

Figures 1, 3H:
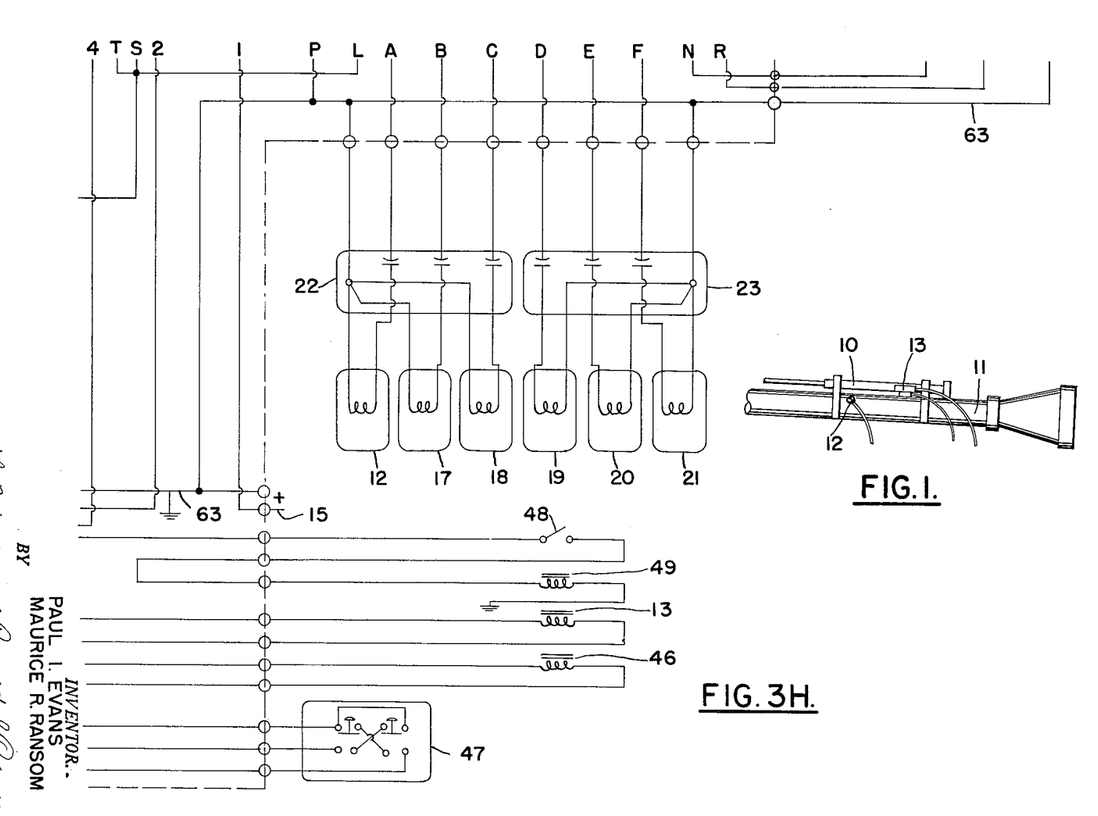

FIG. 1 shows a spotting rifle 10 which is mounted upon a major caliber recoilless rifle 11. The major weapon 11 has a projectile indicator 12. The minor weapon 10 has a safety solenoid 13. Six of these units are included in the armament system in connection with which the present invention is illustrated. The system is operated by a gunner, a loader and a driver.

Figure 2:
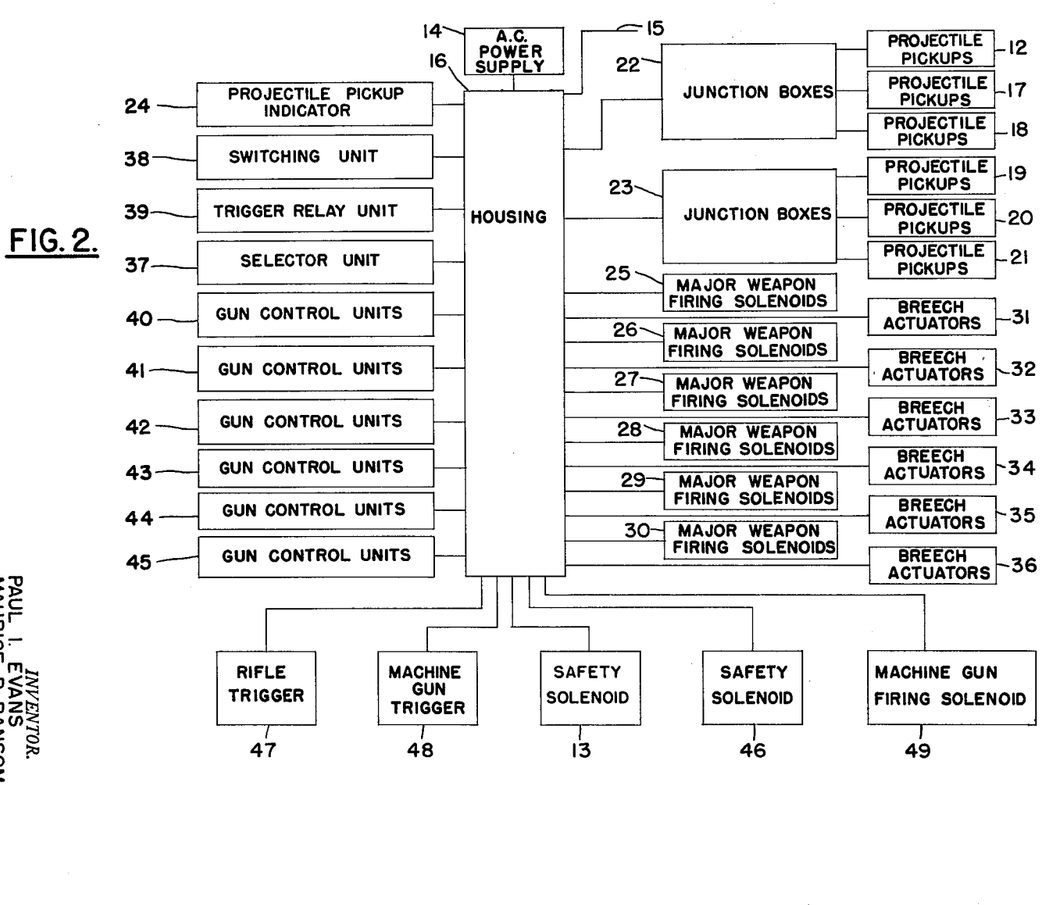
FIG. 2 is a block diagram indicating the relation between the various parts of the system, FIGS. 3A to 3H constitute a wiring diagram of the system.

The block diagram of FIG. 2 shows an alternating current supply source 14 and a 24 volt direct current lead 15 which are connected to a control panel enclosed in a housing 16.

A plurality of projectile pickups 12 and 17 to 21 are connected to this panel through junction boxes 22 and 23. These pickups function to show on an indicator 24 which of the major weapons contain a projectile.

Also connected to the panel 16 are firing solenoids 25 to 30 of the major weapons and their breech actuators 31 to 36. Each of these firing circuits is interlocked with its corresponding actuator so it can be energized only when the breech is closed.

The order in which the firing circuits are energized is determined by a selector unit 37 which is manually controlled. Actual energization of the firing circuits in accordance with the selected order is effected by closure of a major trigger switch which is located in a control switching unit 38 (FIGS. 2, 3B and 3C) and functions through a trigger relay unit 39 to actuate a stepping relay.

The gun control units 40 to 45 are the final links in the firing circuit between the control panel and guns Nos. 1 to 6. They contain breech position indicator lights, the arm switches of the major weapons and the firing contactors for these weapons.

In addition to these various items there are also connected to the panel 16 a handwheel trigger 47 which has two switches for firing the major weapons and the spotting rifles, a foot switch 48 for firing a machine gun, the safety solenoids 13 and 46, which safety the spotting rifles when the spotting rifle arm switch is "off" and a machine gun firing solenoid 49.

As hereinafter pointed out in detail (1) closure of the spotting rifle trigger switch 54 functions through the right side of the trigger relay unit 39 to provide an output pulse which is applied through switches 53 and 52 to arm and select the spotting rifle to be fired, (2) closure of the major weapon trigger switch 55 functions through the left side of the trigger relay unit 39 to provide an output pulse at the pins I and R of the firing selector unit 37, (3) the pulse applied to the pin R is utilized to operate the stepping relay 89, and (4) the pulse applied to the pin S is utilized to fire the major weapon or weapons selected by the stepping relay.

The positions of the stepping relay for firing the different major weapons are indicated by numerals 1, 6, 2, 5, 3 and 4 between the rotary contacts 90 and 91. In the illustrated "Auto Single" position of the manually operated selector switch 82, the major weapons to be fired are selected by closing the corresponding switch 83 to 88. If more than one of these switches are closed, the successive major weapons are fired upon successive closures of the major weapon trigger circuit 55, the stepping relay 89 at the same time switching the connections from one firing circuit to the next. In the "Manual" position of the switch 82 selection of the major weapons to be fired is made by closing the arming switches 95 of the weapons to be fired and opening the arming switches 95 of the weapons not to be fired. In the "Auto Double" position of the switch 82, the firing circuits are connected together in pairs, the firings circuits of each pair being successively energized by operation of the stepping relay. How these various results are produced is now to be considered in greater detail.

The relation between these various elements is shown more clearly in the wiring diagram of FIGS. 3A to 3H wherein parts common to FIGS. 2 and 3A to 3H are indicated by the same reference numerals.

Figure 3A:
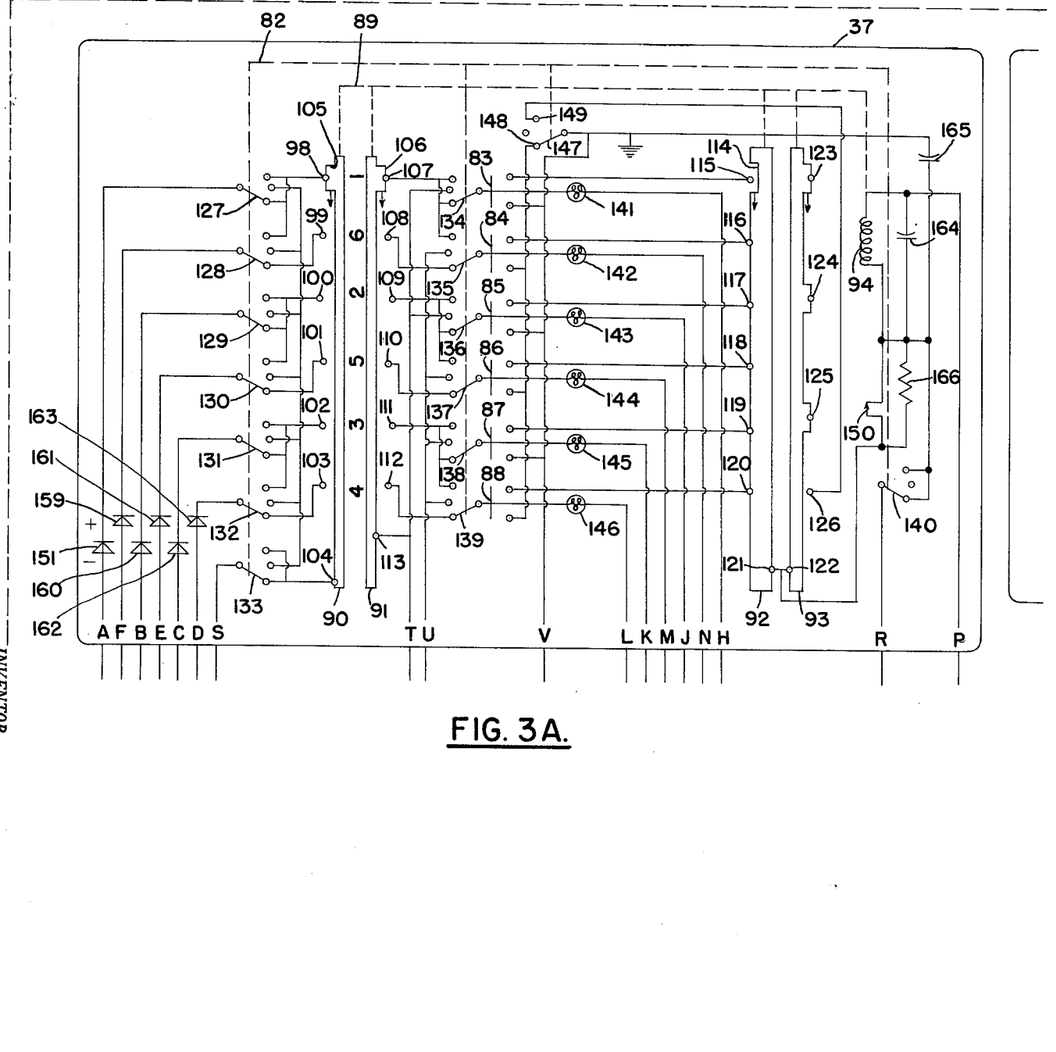
Figure 3B:
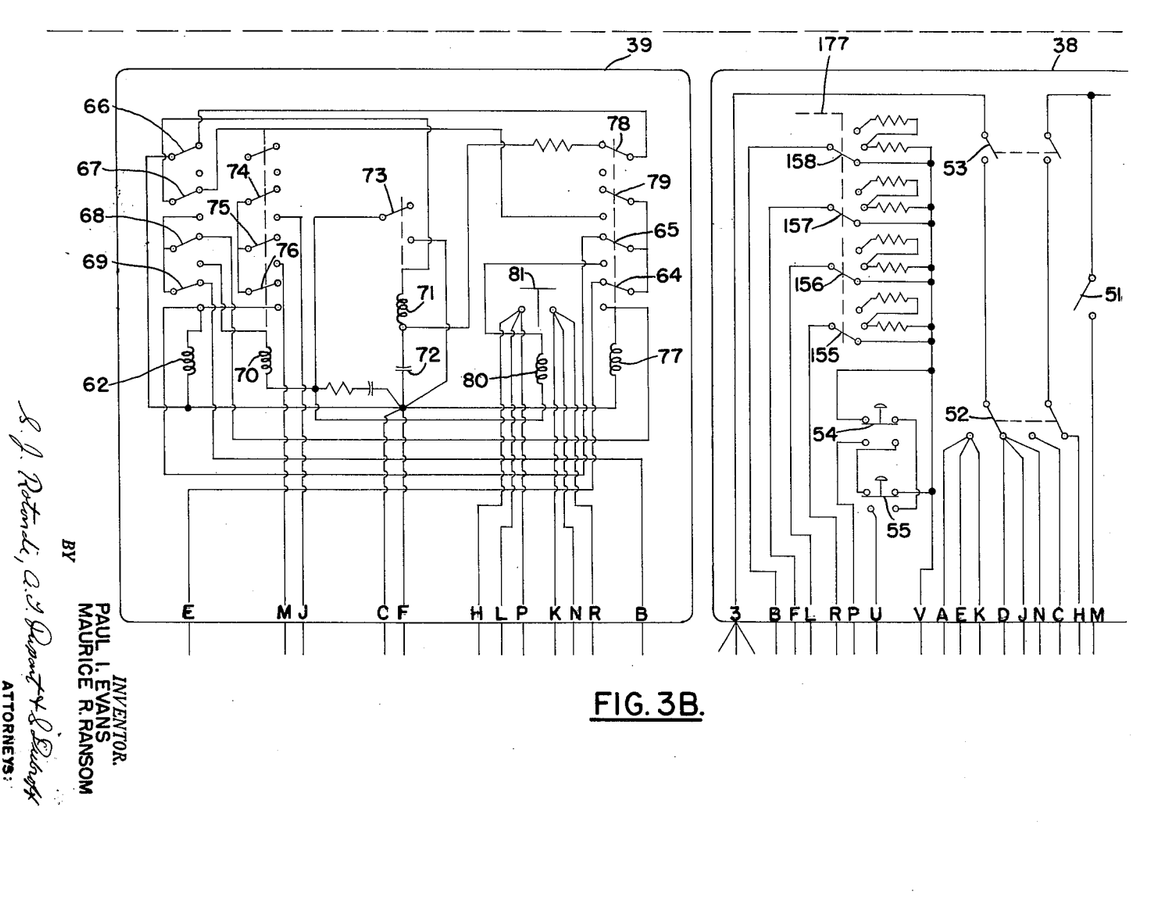
Figure 3C:
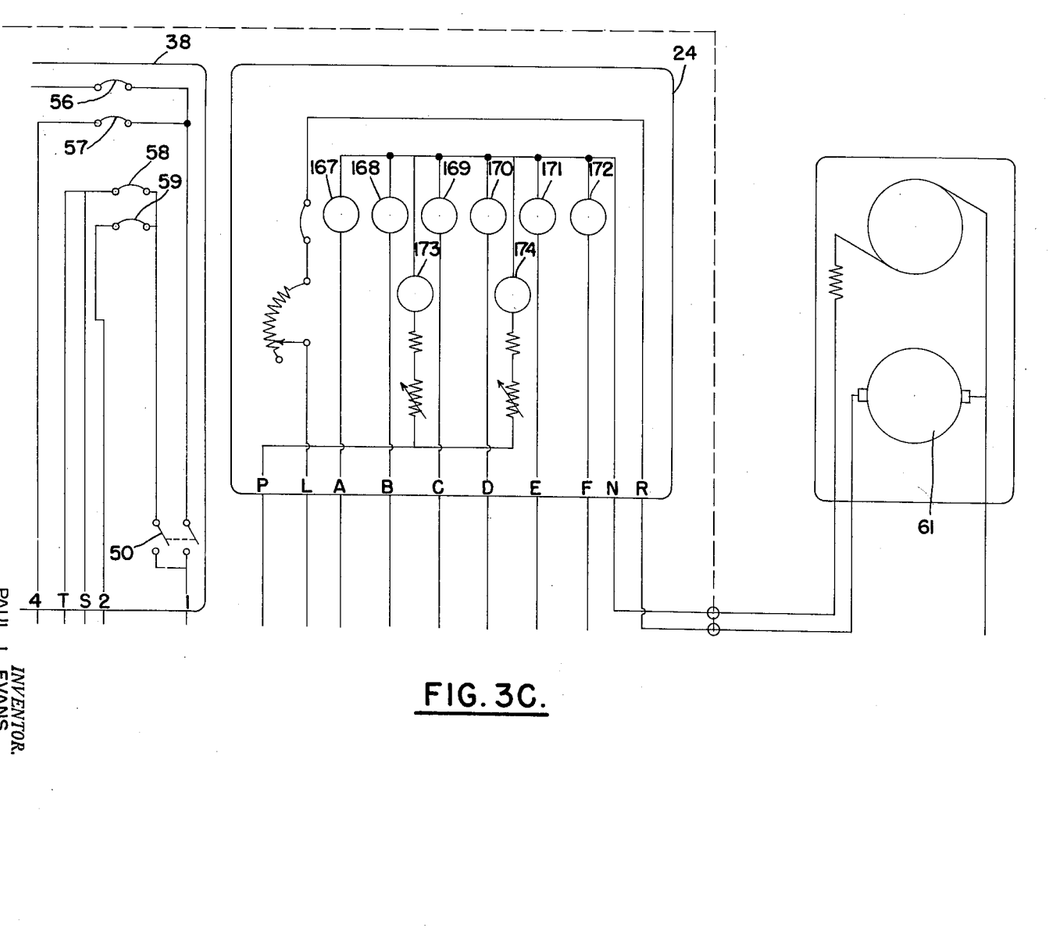
Figure 3D:
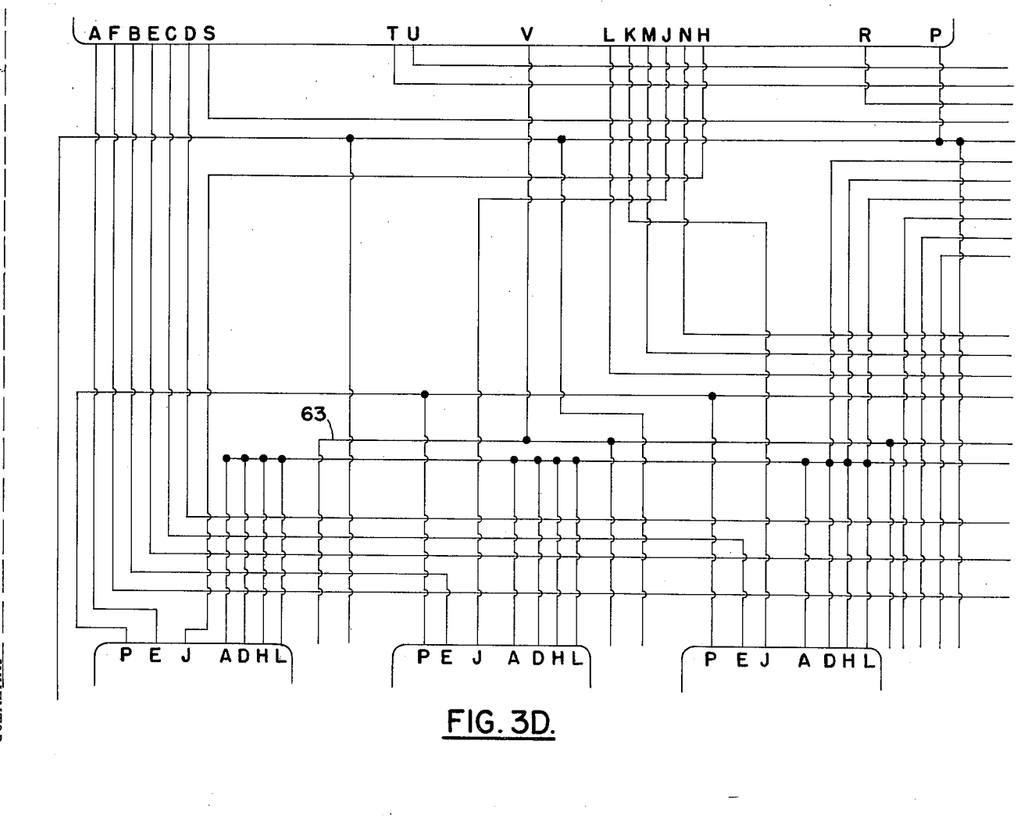
Figure 3E:
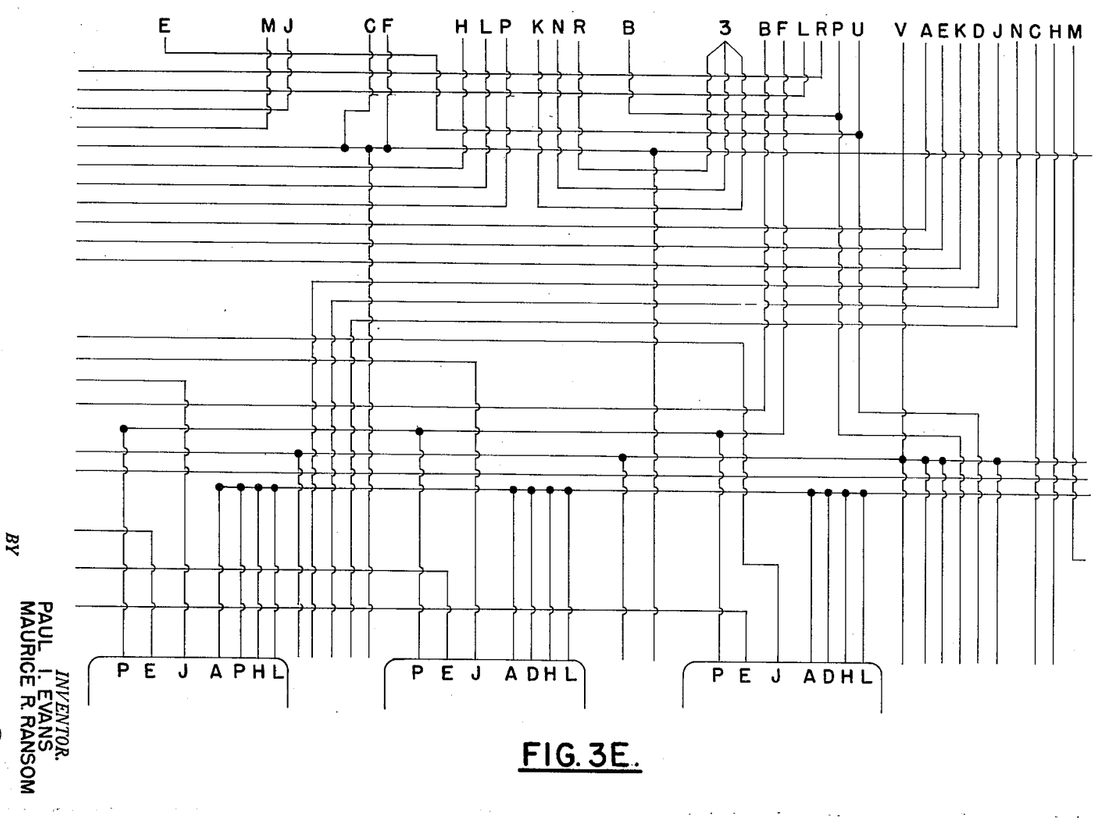
Figure 3F:
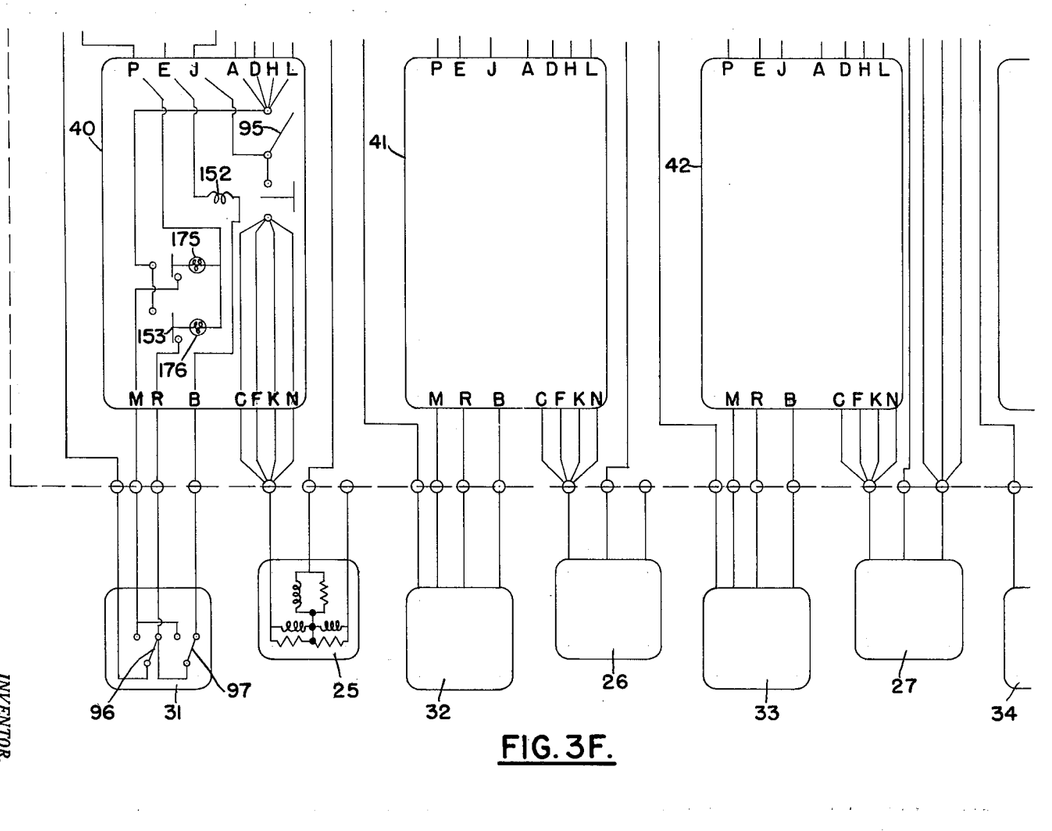
Figure 3G:
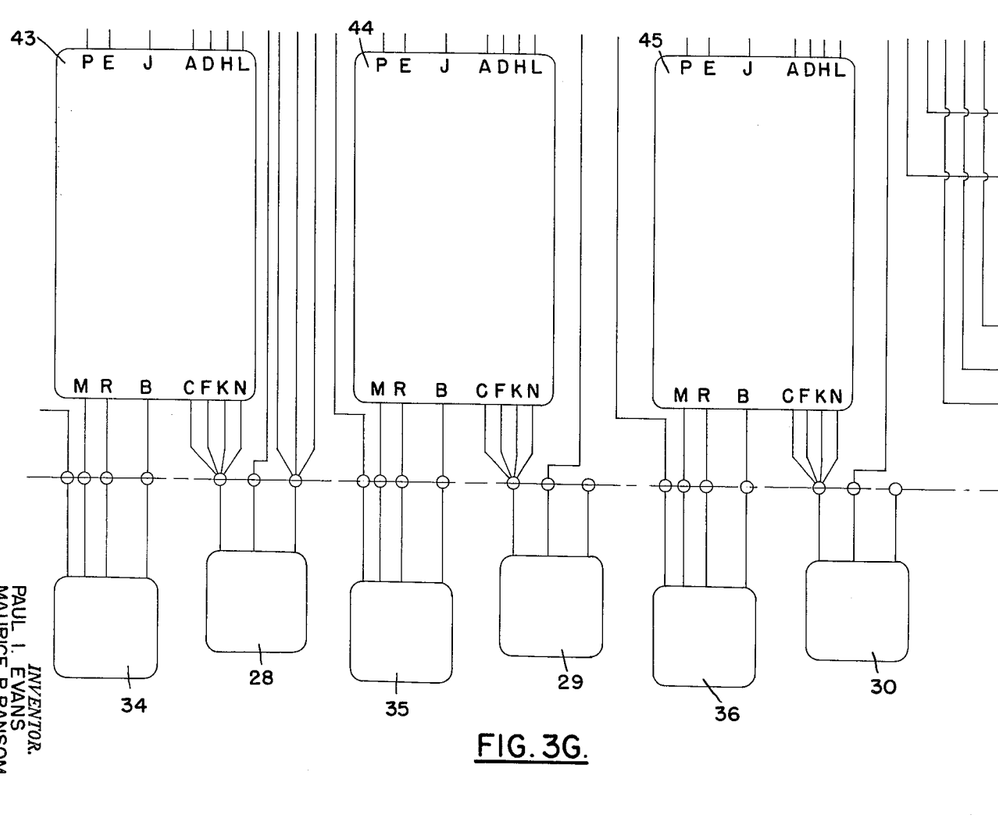

As shown by FIGS. 3B to 3C the control switching unit 38 includes a power input switch 50, a machine gun arm switch 51, the spotting rifle selector switch 52, the spotting rifle arm switch 53, the spotting rifle trigger switch 54, the major weapon trigger switch 55, a plurality of fuses 56, 57, 58 and 59 and a "dim switch" 177 which controls the connections to various indicator lights hereinafter discussed.

The trigger relay circuit 39 (FIG. 3B) functions in response to closure of either of the trigger switches 54 and 55 to produce a voltage output pulse having a time duration of not more than two seconds, thus minimizing the drain on the 24 volt direct current supply source 15—63 (FIG. 3H).

Thus closing of the major trigger switch 55 connects the relay coil 62 to the ground lead 63 through the spotting rifle trigger switch 54, the major trigger switch 55, pins U and E, and switches 64 and 65. This energizes the coil 62 since its other terminal is connected through pins CF and power input switch 50 to the 24 v. terminal 15.

Energization of the relay coil 62 moves switches 66 to 69 to their lower closed positions. This completes a circuit from ground through switches 68 and 69 to the upper terminal of coil 70. It also completes the circuit of a relay coil 71 through switches 69 and 67 and a capacitor 72 thereby closing a switch 73. This connects the other terminal of the relay coil 70 to the 24 v. terminal 15 and energizes the coil 70 thereby closing the switches 74, 75 and 76 and connecting pins M and J to ground.

After a maximum time delay of two seconds, the capacitor 72 is charged, relay coils 70 and 71 are deenergized and pins J and M are disconnected from ground. Release of the major trigger switch 55 which is biased to its illustrated position, deenergizes the relay coil 62, and discharges capacitor 72 through switch 78, putting trigger relay unit in condition to fire another of the major weapons. At this point, it should be understood that the output voltage pulse produced at the pins MJ is utilized by the firing selector unit 37 (FIG. 3A) to control the firing of the major weapons.

Closing the spotting trigger switch 54, which is biased to its illustrated position, connects the upper terminal of a relay coil 77 to ground through switches 68 and 69, pin B, and switch 54 and 55. This energizes coil 77 since its other terminal is connected through pins CF and the switch 50 to the 24 v. lead 15.

Energization of coil 77 moves switches 64, 65, 78 and 79 to their lower positions. In this position, the upper terminal of coil 80 is connected to ground through switches 65, 64, 68 and 69, pins B and P, the two trigger switches 54 and 55 and the power input switch 50. At the same time, the upper terminal of the relay 71 is grounded through switches 64, 79 and 67. This causes relay 71 to be energized by the charging current of capacitor 72, closing the switch 73. This connects the lower terminal of coil 80 through switch 73, pins CF and power input switch 50 to the 24 v. lead 15, thus energizing the coil 80 and closing the switch 81.

Closure of the switch 81 connects the 24 v. input lead 15 through switch 50, pins HLP, switch 81, pins KNR, arm switch 53, and selector switch 52 to the firing circuit of the selected spotting riflle. This fires the selected spotting rifle. It is to be understood that the switch 52 has six fixed contacts each of which is connected to the firing circuit of a different spotting rifle, certain of the connections being omitted in the case of the firing circuits 25, 26, 29 and 30 in order to simplify the drawings.

As in the firing of the major weapons, the timing relay 71—73 returns to normal position when the capacitor 72 becomes charged. This interrupts the current of the relay 80—81 and disconnects the pins KNR from the lead 15.

It will be recalled that the trigger relay unit 39 functions in response to closure of the major trigger switch 55 to produce at its output pins MJ a voltage pulse having a two seconds time duration. This pulse is applied to pins S and R of the firing selector unit 37.

This unit provides means for firing the major weapons Nos. 1 to 6 (1) singly in the sequence 1, 6, 2, 5, 3 and 4, (2) in pairs in the sequence 1 and 6, 2 and 5, and 3 and 4, (3) firing all the rifles in any combination. The sequencing is done through the circuits of a stepping relay 89. The firing of any combination of rifles is done by bypassing the stepping relay circuits in which case all rifles that have been "armed" in the several gun control units will be fired. Means are also provided to choose the rifles next to be fired by actuation of next to fire indicator switches 83 to 88.

The term "armed" as herein used means that the firing circuit is in condition to respond to a voltage pulse. More specifically it means that arm switch 95 (FIG. 3F) is closed and breech actuator switches 96 and 97 are in their illustrated positions.

The selector unit 37 (FIG. 3A) includes (1) a manually operated selector switch 82 which functions to determine the order in which the firing circuits of the major weapons are energized, (2) the manually operated switches 83 to 88 which are operable to choose the major weapon next to be fired and (3) a stepping relay 89 including four switches which have rotatable contact members 90, 91, 92 and 93. For the purpose of clarity these rotatable contact members are shown in FIG. 3A as linear in form. They are rotated from one position to another in response to energization of a relay coil 94 as shown more specifically in FIG. 4.

The rotary switch member 90 has a contact 105 which is arranged to engage fixed contacts 98 to 103, a contact 104 being at all times in engagement with the member 90. Similarly the rotatable contact member 91 has a contact 106 arranged to engage fixed contacts 107 to 112, a contact 113 being in permanent engagement with the member 91. The rotatable contact member 92 has a notch 114 which functions to disengage it from the fixed contacts 115 to 120, contacts 121 and 122 being common to and in permanent engagement with the rotatable contact members 92 and 93. The contact member 93 has contacts 123, 124 and 125 which are arranged to engage a fixed contact 126.

The manually operated selector switch 82 includes movable contacts 127 to 139 each arranged to engage one fixed contact in its "auto double" position, to engage another fixed contact in its "manual" position and to engage still another fixed contact in its "auto single" position. Also controlled by the selector switch 82 are switches 140 and 147. Indicator lights 141 to 146 are each associated with a different one of the major weapons.

Assuming the switch 83 to be closed, the firing selector unit 37 is in the condition it would assume following the firing of the No. 1 major weapon. Under these conditions, the contact 115 is connected to the ground lead 63 through the switch 83 and pin V. Prior to the movement of the rotary contact 92 to a point where the contact 115 registered with the slot 114, a circuit was completed from the ground terminal 63 through pin V, switch 83, contact 115, rotary contacts and 92 and 93 to operating coil 94 of the interrupter 150 and hence through pin P, fuse 58 and power switch 50 to the 24 volt terminal 15.

The completion of this circuit energizes the stepping relay coil 94 which functions to "cock" a spring (see FIG. 4) and to open the interrupter 150. This interrupts the current to coil 94 whereupon the "cocked" spring returns the armature of the stepping switch 89 to its normal position and advances the stepping relay switch one position. This action now repeats itself until the notch 114 in the rotor 92 returns to its illustrated position. In this position, the current to coil 94 is interrupted and the automatic stepping of relay 89 ceases. Likewise if any other combination switch and indicator light 83 to 88 is pressed, the stepping relay advances the switch section positions until the notch 114 is at the contact corresponding to the pressed combination switch and indicator light.

Upon closure of the major trigger circuit 55, ground current flows from the trigger relay unit 39 to pins S and R of the firing selector unit 37 as previously indicated. From the pin S it flows through switch 133, rotary contact member 90, contact 98, switch 127, rectifier 151, relay coil 152 (FIG. 3F) switches 97 and 96, and pins S and T of the control switching unit 38, circuit breaker 58 and switch 50 to high side of the 24 volt source, closing relay 152. Assuming the "arm" switch 95 to be closed, this completes the connection to the firing solenoid 25 of the No. 1 major weapon.

Now from the grounded pin R of the firing selector unit 37 current flows through switch 140 to coil 94, actuating the stepping relay 89 and "cocking" the armature spring. Release of the major trigger circuit 55 to its illustrated position, or action of the timing circuit in trigger relay unit 39 deenergizes the coil 94 and the "cocked" spring returns the stepping switch armature to its normal position and advances the rotors 90, 91, 92 and 93 one position. Now contacts 99 and 105 are engaged and circuits are established for the firing of the No. 6 major weapon.

The next to fire combination switch and indicator lights 141 to 146 indicate the next rifle to fire upon closure of the major trigger circuit 55. From pin J of each of the gun control units 40 to 45 +24 v. is applied through pin H, J, K, L, M and N to one terminal of the lamps 141 to 146 providing the arm switch 95 of these units are closed.

In the stepping switch position shown in FIG. 3A, only indicator lamp 141 is lighted by a ground connection through switch 134, contacts 106 and 107, rotor 91, pin T, pin L of the control switching unit 38, a switch 156 and the pin V. The next stepping cycle engages contact 108 with contact 107 thereby lighting lamp 142 and this type of action continues throughout the firing cycle.

When the selector switch 82 is in its auto double closed position and the major trigger circuit 55 is closed, the grounded pin S of the firing selector unit 37 is connected (1) to the pin A through switch 133, rotor 90, switch 127, and rectifier 151 and to pin F through switch 133, rotor 90, switch 127, switch 128 and rectifier 159. This energizes the No. 1 and No. 6 weapon firing circuits as explained above in connection with the No. 1 weapon firing circuit. At the same time, the coil 94 is connected to ground through the switch 140 and pin R thereby actuating the stepping relay as previously indicated. Upon release of the trigger circuit 55 to its illustrated position, the stepping relay is returned to its normal position, by the tensioned spring, the rotors 90, 91, 92 and 93 are advanced one position and the contacts of the interrupter 150 are closed. The coil 94 is now connected to the grounded pin V through switch 149, contacts 126, 125 and 122 and the interrupter 150. This actuates the stepping relay 89 a second time and the rotors 90, 91, 92 and 93 are advanced one more position. Contacts 125 and 126 are now disengaged so that no further stepping occurs and the circuits are now in a position to energize the No. 2 and No. 5 weapon firing circuits.

It will be noted that in the auto double position of the selector switch 82, the contacts 99, 108, 101, 110, 103 and 112 are disconnected from the circuit. The stepping relay does not stop at these positions but automatically advances to the next position. The switch portion of the combination indicator switch and light numbers 146, 144 and 142 is disconnected from the circuit since switch 147 is in its upper closed position.

Under these conditions, two indicator lamps are lighted for each of the three positions of the stepping relay. For example, lamps 141 and 142 are lighted by current flowing from pin T through contacts 113 and 107, and switch 134 to lamp 141 and from pin T through contacts 113 and 107 and switch 135 to lamp 142. Similar circuits are readily traced from the lamps 143 and 144 and the lamps 145 and 146.

With the selector switch 82 in its manual position, the stepping relay 89 is disconnected from the circuit by switch 140. Selector switches 127 to 133 are all in their central closed positions thereby interconnecting the pins A, F, B, E, C and D with the grounded pin S. Pins H, J, K, L, M and N are connected through indicator lamps 141 to 146 to either pin T or pin U. Thus the lamps 141 to 146 will all be lighted if their respective arm switches in the gun control units are closed.

Only the loaded major weapons to be fired should have their arm switches (such as arm switch 95 of the gun control unit 40) closed. Firing of the armed weapons is effected by a single closure of the major trigger switch 55.

The rectifiers 151 and 159 to 163 function to prevent reverse current flow in the firing circuits. The capacitors 164 and 165 and resistor 166 function to prevent arcing at the contacts of the interrupter 150.

Figure 4:
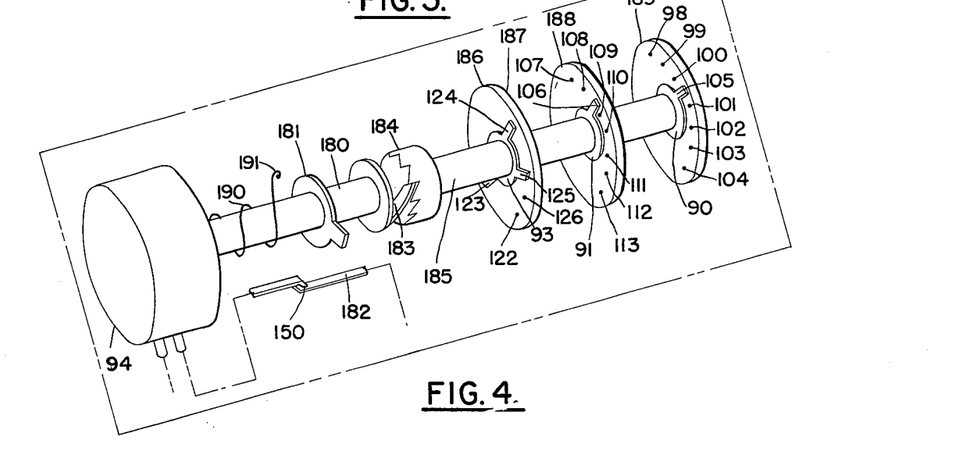
FIG. 4 illustrates a detail of a firing control relay.

The stepping relay 89, shown diagrammatically in FIG. 4, is an existing commercial product consisting, essentially, of a rotary solenoid 94 which, upon receiving an electrical impulse, imparts intermittent limited angular motion to shaft 180. Fixed to shaft 180 is an insulated cam 181 which opens interrupter 150 at, or near, the end of each rotary stroke of the solenoid, causing the solenoid to become de-energized. A resilient pawl 183, mounted at end of shaft 180, engages the ratchet 184, which, in turn is fixed to end of shaft 185. Also fixed to shaft 185 are the rotary switch poles 93, 92 (not shown), 91, 90, so arranged as to make successive contacts in proper sequence with the several contact points 98 through 126, which are associated with the fixed discs 186, 187, 188, 189. In this instance, discs 186 and 187 are opposite faces of the same physical disc. Rotary switch pole 92 (not shown), cooperates with contacts 115 to 121 of fixed disc 187.

In operation, an electrical impulse applied to solenoid 94, causes shaft 180 to rotate clockwise through a limited arc. This angular motion is imparted to pawl 183, causing pawl to back up one step on ratchet 184. Meanwhile, torque spring 190, one end of which engages shaft 180, and the other end fixed at 191 to a portion of the mechanism framework (not shown), is stressed an amount proportioned to the angular motion of shaft 180. As the rotary stroke of the solenoid shaft 180 nears the end of its angular motion, insulated cam 181 engages the flexible element 182 of interrupter 150 separating the contacts of the interrupter and causing the solenoid to become de-energized. The torque spring 190 thereupon returns shaft 180 to its initial position. This action causes pawl 183 to advance the ratchet 184 one step in a counter-clockwise direction. Such step action imparts like motion to the rotary switch poles 105, 106 and 123 to 125 which, in turn, make contacts with the contact points 98 through 126 in the proper predetermined sequence. As the shaft 180 returns to its initial position, cam 181 releases the flexible element 182 of interrupter 150, allowing switch to close. The relay mecahnism is then ready to enter the next succeeding phase of the desired operating cycle.

The projectile indicator unit, heretofore mentioned but not described in detail, is fully disclosed and claimed in a copending application of Maurice R. Ransom, Serial No. 765,001, filed October 2, 1958, for "Projectile Sensing and Indicating Device." Briefly stated, it includes a magnetic reluctance type pickup 12, 17, 18, 19, 20 or 21 mounted on the gun barrel at the position of the projectile bourrelet when the ammunition is chambered. These units pick up and transmit information showing when a projectile is in the gun. This information is conveyed to the gunner by means of indicator lamps 167 to 172. Additional lamps 173 and 174 are provided for the purpose of comparison, one of them being adjusted to a brightness corresponding to the brightness of the lamps 167 to 172 when a projectile is present and the other being adjusted to a brightness corresponding to the brightness of the lamps 167 to 172 when no projectile is present.

The hydraulic breech actuator including the "safe" switch 96 and the "close" switch 97 is fully disclosed and claimed in a copending application of Paul I. Evans, Serial No. 797,826 filed April 2, 1959, for "Hydraulically Operated Breech Mechanism." As disclosed in this copending application, the function of the breech actuator, operated by fluid pumped from a remote point, is to move the breech between its safe and closed positions and to actuate the switches 96 and 97 through which lamps 175 and 176 are lighted and certain circuits of the gun control units are completed.

Not heretofore discussed in detail is a dim switch 177 (FIG. 3B) including movable contactors 155 to 158. The contactor 155 is connected to the pin U of the firing selector unit 37 and the contactor 156 is connected to the pin T of this unit. These two contactors are movable to three different positions for controlling the brightness of the indicator lamps 141 to 146. The contactor 158 is connected to the pins P of the gun control units of weapons Nos. 1, 2 and 3 and controls the brightness of the indicators of these units. Similarly the contactor 157 is connected to the pins P of gun control units of weapons Nos. 4, 5 and 6 and controls the brightness of the indicators of these units.

The structure of the spotting rifle safety solenoids is fully disclosed and claimed in a copending application of Paul I. Evans and Maurice R. Ransom, Serial No. 797,319, filed March 4, 1959, for "Remote Safety Device."

They include an electromagnet which is clamped to the firing mechanism casing and has a pin arranged to block the sear when the magnet is not energized.

Figure 5:
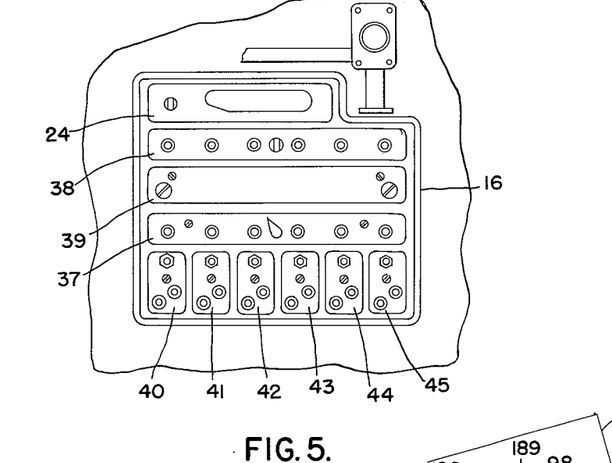
FIG. 5 shows the arrangement of a panel from which the weapon control system is operated.

The weapon control system heretofore described is controlled from the gunner's compartment of a vehicle through a control panel enclosed in a housing 16, such as that shown by FIG. 5. This panel is located in front of the gunner and functions to relay signals from the gunner to the weapons and vice versa.

As can be seen from FIG. 5, the panel is composed of functional divisions or layers. These layers, five in all, comprise ten individual units. Thus the bottom layer contains the six gun control units 40 to 45, the next layer contains the selector unit 37, the next unit contains the relay unit 39, the next unit contains the control switching unit 38 and the top layer contains the projectile indicator unit 24. How all these things are operated has been explained in connection with the wiring diagram FIG. 3A to FIG. 3H.

We claim:

1. In a system for controlling the firing of a plurality of major and spotter weapons each having a firing circuit, the combination therewith of major and spotter weapon trigger switches interlocked so that each is operable to complete a circuit only when the other is open, means including a control switching unit operable to deliver a transient pulse for firing said spotting weapons upon the closure of said spotting weapon trigger circuit and to deliver said pulse for firing said major weapons upon the closure of said major weapon trigger circuit, a three-position switch operable to a first position to connect said major weapon firing circuits so that they may be energized successively, operable to a second position to connect said major weapon firing circuits so that they may be energized manually and operable to a third position to connect said major weapon firing circuits so that they may be energized successively in pairs, a stepping relay operable by successive closures of said major weapon trigger switch and successive repetitions of said transient pulse to complete a connection in successive ones of said major firing circuits when they are connected to be fired successively one after the other or to be fired successively in pairs, and manually operated switching means for operating said stepping relay to select said firing circuits when they are connected to be fired manually.

2. In a system for controlling the firing of a plurality of major and spotter weapons each having a firing circuit, the combination therewith of major and spotter weapon trigger switches interlocked so that each is operable to complete a circuit only when the other is open, means including a control switching unit operable to deliver a transient pulse for firing said spotting weapons upon the closure of said spotting weapon trigger circuit and to deliver said pulse for firing said major weapons upon the closure of said major weapon trigger circuit, a three-position switch operable to a first position to connect said major weapon firing circuits so that they may be energized successively, operable to a second position to connect said major weapon firing circuits so that they may be energized manually and operable to a third position to connect said major weapon firing circuits so that they may be energized successively in pairs, a stepping relay operable by successive closures of said major weapon trigger switch and successive repetitions of said transient pulse to complete a connection in successive ones of said major weapon firing circuits when they are connected to be fired successively one after the other or to be fired successively in pairs, means for manually operating said stepping relay to select said firing circuits when they are connected to be fired manually and a switch operable to different positions for selecting the spotter weapon firing circuit to which said transient pulse is applied upon the closing of said spotter weapon trigger circuit.

3. In a system for controlling the firing of major and spotter weapons each having a firing circuit, the combination therewith of major and spotter weapon trigger switches interlocked so that each is operable to complete a circuit only when the other is open, and means including a control switching unit, said unit including a capacitor, a source of power, a first relay switch for completing a connection between said source and said spotter weapon firing circuit, a second relay operable upon closure of said spotter trigger switch to ground one terminal of said first relay switch and to connect said capacitor to said source, and a third relay switch operated by the charging current of said capacitor to connect the other terminal of said first relay switch to said source and complete said connection between said source and said spotter weapon firing circuit, said first and third relay switches being deenergized and opened upon the termination of said capacitor charging current and said second relay switch being opened upon the opening of said spotter weapon trigger switch.

4. In a system for controlling the firing of a plurality of major and spotter weapons each having a firing circuit, the combination therewith of major and spotter weapon trigger switches interlocked so that each is operable to complete a circuit only when the other is open, and means including a control switching unit, said unit including a capacitor, a source of power, a pair of output terminals, a relay switch adapted to connect said capacitor to said output terminals, a relay switch having its operating coil connected to one terminal of said power source in series with said capacitor and adapted to complete a connection between said source and one terminal of said first mentioned relay switch, and a relay switch operable upon the closure of said major weapon trigger circuit to complete the connections of said first and second mentioned relay switches to said source, said first and second mentioned relay switches being deenergized and opened upon the termination of the charging of said capacitor and said capacitor being discharged through said output terminals upon the opening of said major weapon trigger circuit and the deenergization of said third mentioned relay switch.

5. A system according to claim 4 wherein the discharge of said capacitor is applied to the firing circuits of said major weapons under the control of a stepping relay actuated by said discharge.

References Cited in the file of this patent

UNITED STATES PATENTS

| | | |
|---|---|---|
| 1,438,833 | Kaminski | Dec. 12, 1922 |
| 2,144,957 | Bell | Jan. 24, 1939 |
| 2,297,006 | Lohman | Sept. 29, 1942 |
| 2,351,336 | Hooven | June 13, 1944 |
| 2,421,893 | Lambert et al. | June 10, 1947 |
| 2,817,272 | Gunder | Dec. 24, 1957 |
| 2,882,797 | Musser | Apr. 21, 1959 |
| 2,895,381 | Musser | July 21, 1959 |
| 2,956,211 | Wolfe | Oct. 11, 1960 |